(12) United States Patent
Samudrala et al.

(10) Patent No.: US 11,100,672 B2
(45) Date of Patent: Aug. 24, 2021

(54) SYSTEM AND METHOD FOR REDUCING JITTER IN AUGMENTED REALITY

(71) Applicant: Myntra Designs Private Limited, Bangalore (IN)

(72) Inventors: Arun Samudrala, Karnataka (IN); Vasuki K Setlur, Karnataka (IN); Relix Johnrose, Karnataka (IN); Sharathkumar M, Karnataka (IN)

(73) Assignee: Myntra Designs Private Limited, Bangalore (IN)

( * ) Notice: Subject to any disclaimer, the term of this patent is extended or adjusted under 35 U.S.C. 154(b) by 0 days.

(21) Appl. No.: 16/731,367

(22) Filed: Dec. 31, 2019

(65) Prior Publication Data

US 2021/0097712 A1  Apr. 1, 2021

(30) Foreign Application Priority Data

Sep. 27, 2019  (IN) .............................. 201941039071

(51) Int. Cl.
| | |
|---|---|
| *G06T 7/73* | (2017.01) |
| *G06T 19/00* | (2011.01) |
| *G06F 3/01* | (2006.01) |
| *G06K 9/00* | (2006.01) |

(52) U.S. Cl.
CPC ................ *G06T 7/73* (2017.01); *G06F 3/011* (2013.01); *G06F 3/017* (2013.01); *G06K 9/00671* (2013.01); *G06T 19/006* (2013.01); *G06T 2207/30204* (2013.01)

(58) Field of Classification Search
None
See application file for complete search history.

(56) References Cited

U.S. PATENT DOCUMENTS

| | | | | |
|---|---|---|---|---|
| 2009/0195538 | A1* | 8/2009 | Ryu ....................... | G06T 19/006 345/419 |
| 2010/0098295 | A1* | 4/2010 | Zhang ................ | G06K 9/00798 382/103 |
| 2017/0249745 | A1* | 8/2017 | Fiala ................... | G02B 27/0093 |

* cited by examiner

*Primary Examiner* — Steven Z Elbinger
(74) *Attorney, Agent, or Firm* — BakerHostetler

(57) ABSTRACT

Systems and method for enhancing user experience by using augmented reality are presented. A system includes an image receiver configured to receive an image of a target object and a marker, and a processor including a marker identifier, a marker adjustment module, a virtual object retriever, and a renderer. The marker identifier is configured to identify a unique marker ID and real-time spatial attributes of the marker. The marker adjustment module is configured to apply a correcting algorithm to real-time spatial attributes of the marker to determine adjusted spatial attributes of the marker. The virtual object retriever is configured to retrieve a virtual object associated with the target object based on the unique marker ID. The renderer is configured to render the virtual object based on the adjusted spatial attributes of the marker. The adjusted spatial attributes compensate for any jitter experienced during rendering of the virtual object.

19 Claims, 8 Drawing Sheets

SYSTEM AND METHOD FOR REDUCING JITTER IN AUGMENTED REALITY

PRIORITY STATEMENT

The present application hereby claims priority to Indian patent application number 201941039071 filed on 27 Sep. 2019, the entire contents of which are hereby incorporated herein by reference.

BACKGROUND

Embodiments of the description generally relate to enhancing user experience in augmented reality-based implementations, and more particularly to reducing jitter in augmented reality-based implementations in a retail environment.

Augmented reality is a technology in which a view of the real physical world is augmented by computer-generated information. For example, a view of the real world through a camera of a hand-held device may be augmented with text, graphics, video, 3D animation, and the like. The augmented experience may provide further information about objects in the real world or enhance the real world experience for the user in the augmented reality environment.

The augmented reality system may recognize real objects and match the recognized objects with data, or the like, and computer-generated information about the objects may be displayed together with the object in the augmented reality view. In some marker-based augmented reality implementations, when a user views a real-world object through a mobile camera, the system identifies the marker present in the real world object and then applies an augmented reality experience over the real video stream. The augmented experience is positioned over the real world marker based upon the detected marker position. In such implementations, it is desirable that the augmented experience is positioned over the marker position at all times, such that the overall experience is intact and jitter is not experienced.

However, in practical implementations of marker-based augmented reality systems, there may be variations in the marker positions due, at least in part, to movements of the camera or movements of the target object itself. For example, the detected marker position may change because of the movements in the user's hands holding the camera. Similarly, in instances when the target object is held or worn by a user, body movements of the user may result in variations in the marker's position. In such instances, rendering of the augmented reality experience based on the originally detected marker location may result in jitter or a noisy experience to the user. The jitter experienced may be further magnified in implementations where the augmented experience has to be scaled up with respect to the marker position.

Thus, there is a need for augmented reality systems and methods that minimize or eliminate the jitter experienced during augmented reality implementations.

SUMMARY

The following summary is illustrative only and is not intended to be in any way limiting. In addition to the illustrative aspects, example embodiments, and features described, further aspects, example embodiments, and features will become apparent by reference to the drawings and the following detailed description. Example embodiments provide systems and methods to Briefly, according to an example embodiment, a system for enhancing user experience by using augmented reality is presented. The system includes an image receiver and a processor operatively coupled to the image receiver. The image receiver is configured to receive an image, from an imaging device, of a target object comprising a marker. The processor includes a marker identifier configured to identify a unique marker ID and real-time spatial attributes of the marker from the received image. The processor further includes a marker adjustment module configured to apply a correcting algorithm to one or more real-time spatial attributes of the marker to determine one or more adjusted spatial attributes of the marker. The processor furthermore includes a virtual object retriever configured to retrieve a virtual object associated with the target object, based on the unique marker ID. Moreover, the processor includes a renderer configured to render the virtual object on a display unit, based on the one or more adjusted spatial attributes of the marker, wherein the adjusted spatial attributes of the marker compensate for any jitter experienced during the rendering of the virtual object.

According to another example embodiment, a hand-held system for enhancing user experience by using augmented reality in a retail environment is presented. The hand-held system includes an imaging device, a display unit, and an augmented reality application communicatively coupled to the imaging device and the display unit. The augmented reality application includes an image receiver and a processor operatively coupled to the image receiver. The image receiver is configured to receive an image, from an imaging device, of a retail item including a marker. The processor includes a marker identifier configured to identify a unique marker ID and real-time spatial attributes of the marker from the received image. The processor further includes a marker adjustment module configured to apply a correcting algorithm to one or more real-time spatial attributes of the marker to determine one or more adjusted spatial attributes of the marker. The processor furthermore includes a virtual object retriever configured to retrieve a virtual object associated with the retail item, based on the unique marker ID. Moreover, the processor includes a renderer configured to render the virtual object on a display unit, based on the one or more adjusted spatial attributes of the marker, wherein the adjusted spatial attributes of the marker compensate for any jitter experienced during the rendering of the virtual object.

According to yet another example embodiment, a method for enhancing user experience by using augmented reality is presented. The method includes receiving an image of a target object includes a marker, from an imaging device. The method further includes identifying a unique marker ID and real-time spatial attributes of the marker from the received image. In addition, the method includes retrieving a virtual object associated with the target object, based on the unique marker ID. The method further includes applying a correcting algorithm to one or more real-time spatial attributes of the marker to determine one or more adjusted spatial attributes of the marker. The method furthermore includes rendering the virtual object on a display unit, based on the one or more adjusted spatial attributes of the marker wherein the adjusted spatial attributes of the marker compensate for any jitter during rendering of the virtual object.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein.

DETAILED DESCRIPTION OF EXAMPLE EMBODIMENTS

Figure 1:
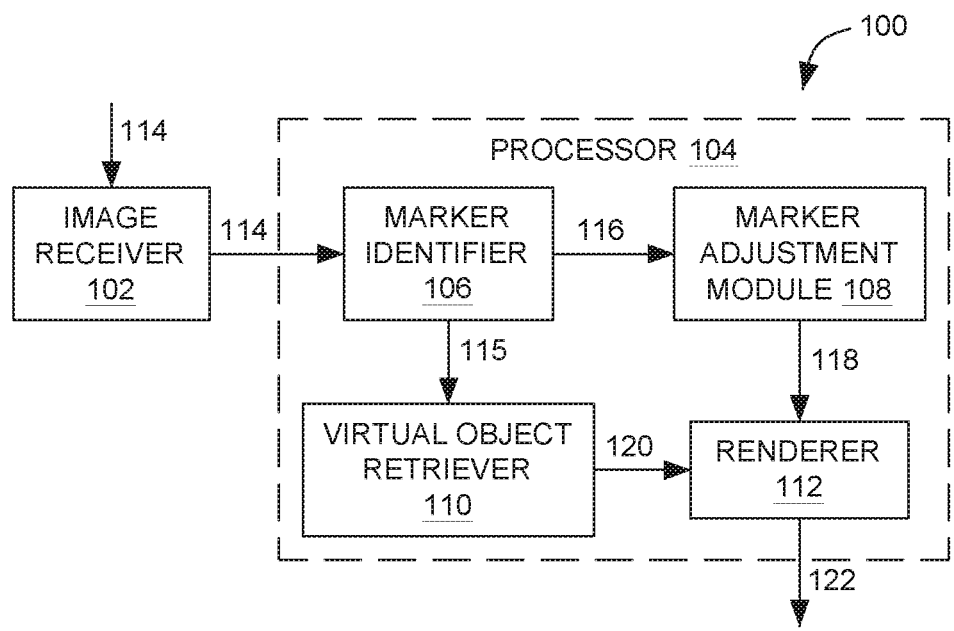
FIG. 1 is a block diagram illustrating a system for enhancing user experience by using augmented reality, according to some aspects of the present description.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figures. It should also be noted that in some alternative implementations, the functions/acts/steps noted may occur out of the order noted in the figures. For example, two figures shown in succession may, in fact, be executed substantially concurrently or may sometimes be executed in the reverse order, depending upon the functionality/acts involved.

The terminology used herein is for the purpose of describing particular example embodiments only and is not intended to be limiting. Unless otherwise defined, all terms (including technical and scientific terms) used herein have the same meaning as commonly understood by one of ordinary skill in the art to which example embodiments belong. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Example embodiments of the present description present systems and methods for enhancing user experience by using augmented reality.

FIG. 1 is a block diagram of a system 100 for enhancing user experience by using augmented reality. The system 100 includes an image receiver 102 and a processor 104 operatively coupled to the image receiver 102. The processor 104 further includes a marker identifier 106, a marker adjustment module 108, a virtual object retriever 110, and a renderer 112. The image receiver 102 and the components of the processor 104 are described in further detail below.

The image receiver 102 is configured to access and receive an image 114 of a target object from an imaging device. The imaging device may include a camera configured to capture visible, infrared, or ultraviolet light. In one embodiment, the imaging device may be a component of a handheld device, such as a mobile phone, a tablet, a gaming device, and the like. In another embodiment, the imaging device may be external to the handheld device and is configured to be communicatively coupled to the handheld device via a wired or wireless connection, e.g., a Bluetooth camera.

The image 114 received by the image receiver 102 may be a still image or part of a sequence of images, such as a sequence in a video stream. In some implementations, the image 114 captured may be static. For example, after the image 114 is captured and received by the image receiver, the system 100 may continue to use it as the background image even after the imaging device has moved or the background has otherwise visually changed. In some implementations, the background image in the augmented view may be dynamically updated. For example, the image 114 received by the image receiver 102 may be an image currently captured by the imaging device, and may thus be updated as the imaging device moves or as the background otherwise changes.

The target object may include any suitable object that a user may experience using augmented reality. Non-limited examples of target objects include retail items, printed media (e.g., catalogs, magazines, flyers, posters, etc.), billboards, product packaging and the like. In an example embodiment, the target object includes retail items such as garments, shoes, bags, consumer electronics, toys, games, or vehicles. The image of the target object may be captured at a retail location (e.g., a store, a mall, e-commerce site), at a user's home, or at any other location where a retail item is present actually or virtually (e.g., at a bus stop where a billboard is present). In another embodiment, the image of the target object, such as a retail item, may be captured after the retail item is purchased, and thus may be independent of the original retail location.

The target object includes a marker. The marker may be any suitable fiduciary marker. As used herein, the term "fiduciary marker" refers to an object placed in the field of view of the imaging device which appears in the image produced, for use as a point of reference or a measure. Further, the fiduciary marker may be perceptible or imperceptible to the human eye. Fiduciary markers may include Hiro markers, template markers, or 2D barcode markers. In one embodiment, the target includes a 2D bar code marker. Non-limiting examples of suitable 2D barcode markers include Aztec code, data matrix, maxi code, PDF417, QR Code and the like.

In one embodiment, the target object includes a data matrix marker. Data matrix marker is a two-dimensional barcode that has either a rectangular or square shape. It includes modules (i.e. cells) and is bordered by a finder pattern. The data is encoded using modules and depending on the coding method used, a white cell represents "0" and a black cell represents "1". The finder pattern includes an L finder pattern that identifies the size and orientation of the marker, and a clock track that defines the structure of the marker.

Figures 2A, 2B:
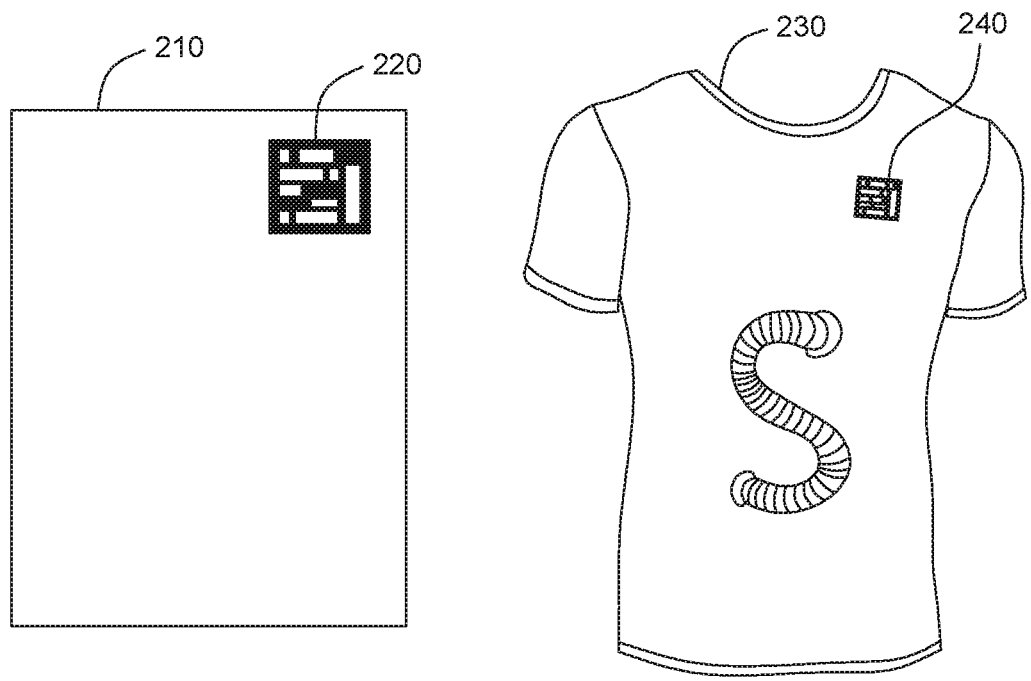
FIG. 2A is a schematic illustration of an example target object including a marker, according to some aspects of the present description.
FIG. 2B is a schematic illustration of an example retail item including a marker, according to some aspects of the present description.

Referring now to FIGS. 2A and 2B, target objects including 2D barcode markers are schematically represented, in accordance with an example embodiment. As shown in FIG. 2A, a target object 210 includes a 2D barcode marker 220. Similarly, in FIG. 2B a retail item such as a garment 230 is schematically represented. The garment 230 includes a 2D barcode marker 240. In an example embodiment, the markers 220 and 240 are data matrix markers.

Referring back to FIG. 1, the processor 104 is communicatively coupled to the image receiver 102. The processor 104 further includes a marker identifier 106 that is also communicatively coupled to the image receiver 102, and is configured to receive the image 114 of the target object. Image 114 further includes an image of the marker. The marker identifier 106 is configured to identify a unique marker ID 115 and real-time spatial attributes 116 of the marker from the received image 114.

In one embodiment, the marker identifier 106 is configured to execute an image recognition algorithm to detect a unique marker pattern based on one or more features in the image 114. For example, in embodiments employing data matrix markers, the marker identifier 106 is configured to execute an image recognition algorithm to detect a unique marker pattern (e.g., a finder pattern in a 2D bar code) to detect the marker in the received image 114. In such embodiments, the marker identifier 106 is further configured to execute a decoding algorithm. In a 2D bar code, the data is encoded using modules (or cells) and depending on the coding method used, a white cell represents "0" and a black cell represents "1". The 2D bar codes are decoded by calculating the center and the size of each cell. Then, for each cell, a binary value is assigned, so that the whole data of the marker can be presented as either a series of binary values or as a binary number. The binary number corresponds to the marker identification, i.e., the unique marker ID 115. And, the series of binary values provide additional information about the marker. In one embodiment, marker identifier 106 is configured to execute a decoding algorithm to detect a data matrix marker, and identify a unique marker ID 115 from the data matrix marker.

In other embodiments, employing template markers, the marker identifier 116 may be configured to execute an image recognition algorithm that searches for the marker features in the received image and identifies the unique marker pattern of the marker image. In such instances, the marker identifier 106 is further configured to execute a database query algorithm that queries a database storing marker templates. The database of stored marker templates may be either stored locally (e.g., in a memory coupled to the processor 104) or may be stored in a remote server (e.g., cloud storage). The marker identifier 106 may be further configured to execute a matching algorithm that matches the identified unique marker pattern against the marker templates, and the best match is selected as the correct marker. The selected marker has a unique marker ID 115 associated with it.

The marker identifier 106 is further configured to identify one or more real-time spatial attributes 116 of the marker from the received image 114. The term "real-time spatial attributes", as used herein, refers to the translational, scaling and rotational ($TSR_{mr}$) aspects of the marker in the real world at the time of capturing the image 114. These are later employed to render a virtual object on a display unit. The $TSR_{mr}$ aspects of the marker provide information with respect to at least one of spatial depth (scale and z-axis location), orientation (rotation), or lateral/vertical position (x- and y-axis location) of the marker in the real world at the time of capturing the image 114.

In one embodiment, the real-time spatial attributes 116 of the marker include at least one of real-time translational coordinates of the marker or real-time orientation (or rotational) states of the marker. The term "real-time translational coordinates", as used herein, refers to the 3-dimensional coordinates of the marker in the real world coordinate system at the time of capturing the image 114. The real-time translation coordinates include the x-axis coordinates, y-axis coordinates and z-axis coordinates ($X_{mr}$, $Y_{mr}$, $Z_{mr}$), of the marker in the real world coordinate system at the time of capturing the image 114. Similarly, the term "real-time orientation states", as used herein, refers to orientation states of the marker in the real world coordinate system at the time of capturing the image 114. The real-time orientation states are sometimes also referred to as rotational aspects of the marker, as described herein earlier. The real-time orientation states are usually a floating-point array of size 4. In quadruple notation, these can be represented as ($rx_{mr}$, $ry_{mr}$, $rz_{mr}$, $rw_{mr}$). In some embodiments, the real world coordinates and real world orientation states may be accessed via a library, e.g., an open source library.

The processor 104 further includes a marker adjustment module 108 configured to apply a correcting algorithm to one or more real-time spatial attributes 116 of the marker to determine one or more adjusted spatial attributes 118 of the marker. The marker adjustment module 108 is communicatively coupled to the marker identifier 106 and configured to receive the one or more real-time spatial attributes 116 of the marker from the marker identifier 106. As noted earlier, rendering of the augmented reality experience using the real-time spatial position of the marker may result in jitter. Embodiments of the present description at least partially compensate for the jitter by employing a correcting algorithm to the real-time spatial attributes of the marker. The marker adjustment module 108 is also communicatively coupled to the renderer 112 and configured to transmit the one or more adjusted spatial attributes 118 of the marker to the renderer 112.

In one embodiment, the correcting algorithm is a filtering algorithm, such as an exponential smoothing algorithm, a low-pass filter algorithm, or moving average algorithm. Exponential smoothing algorithm has a dynamic learning parameter (alpha, $\alpha$), whereas the low-pass filter algorithm has a constant learning parameter (alpha, $\alpha$). In one example embodiment, the correcting algorithm is a low-pass filter algorithm.

The marker adjustment module 108 may be further configured to apply the correcting algorithm to both the real-time translation coordinates ($X_{mr}$, $Y_{mr}$, $Z_{mr}$), of the marker and the real-time orientation states ($rx_{mr}$, $ry_{mr}$, $rz_{mr}$, $rw_{mr}$) of the marker to determine adjusted translation coordinates ($X_{ma}$, $Y_{ma}$, $Z_{ma}$) of the marker and adjusted orientation states ($rx_{ma}$, $ry_{ma}$, $rz_{ma}$, $rw_{ma}$) of the marker. In such instances, a learning parameter (alpha, $\alpha$) of the correcting algorithm applied to the real-time translation coordinates of the marker may be different from a learning parameter (alpha, $\alpha$) of the correcting algorithm applied to the real-time orientation states of the marker. In an example embodiment, the learning parameter of the correcting algorithm applied to the real-time translation coordinates of the marker is 0.02 and the learning parameter of the correcting algorithm applied to the real-time orientation states of the marker is 0.01.

The processor 104 further includes a virtual object retriever 110 communicatively coupled to the marker identifier 106. The virtual object retriever 110 is configured to receive the unique marker ID 115 from the marker identifier 106, and further configured to retrieve a virtual object 120 associated with the target object, based on the unique marker ID 115. In one embodiment, the virtual object retriever 110 is configured to query a virtual object database that stores virtual objects. The stored virtual objects may be each associated with a unique marker ID. The database of virtual objects may be either stored locally (e.g., in a memory coupled to the processor 104) or may be stored in a remote server (e.g., cloud storage). The virtual object retriever 110 may be further configured to execute a matching algorithm that matches the unique marker ID 115 received from the marker identifier 106 with the marker IDs of the stored virtual objects. Once a match is made, the virtual object retriever 110 retrieves the virtual object 120 corresponding to unique marker ID 115. The virtual object retriever 110 is also communicatively coupled to the renderer 112 and configured to transmit the retrieved virtual object to the renderer 112. Non-limiting examples of the virtual object 120 include a video, a two-dimensional (2D) animation, a three-dimensional (3D) animation, a 3D image, or combinations thereof.

The renderer 112 is communicatively coupled to marker adjustment module 108 and the virtual object retriever 110. The renderer is configured to receive the one or more adjusted spatial attributes 118 of the marker from the marker adjustment module 108 and to receive the retrieved virtual object 120 from the virtual object retriever 110. The renderer is configured to render the virtual object 122 on a display unit, based on the one or more adjusted spatial attributes 118 of the marker. As described in detail later, the one or more adjusted spatial attributes of the marker compensate for any jitter during the rendering of the virtual object 122.

According to embodiments of the present description, by using the one or more adjusted spatial coordinates of the marker ($TSR_{ma}$) to render the virtual object, any jitter experienced during the rendering of the virtual object may be compensated. This is in contrast to augmented reality applications that use the real-time spatial attributes of the marker ($TSR_{mr}$) to render the virtual object. In one embodiment, the jitter may be substantially reduced. In another embodiment, the jitter may be eliminated, thereby enhancing user experience. The term "jitter" as used herein refers to the undesirable effect of noise in the tracking of the marker, which is perceived by the user as vibration or interrupted movements of augmented virtual objects. For still virtual objects such as 3D images that are not supposed to be moving at all, this may be experienced by the user as vibrations of the 3D images. For virtual objects such as animations or videos, this may be experienced by the user as jerky movements in the animations or videos.

The renderer 112 may be configured to render the virtual object 120 such that the rendered virtual object 122 is overlaid completely or partially on the image 114. Thus, the rendered virtual object 122 may be overlaid on a background including the captured image 114. Furthermore, the rendered virtual object 122 may be overlaid on the complete image 114 of the target object or a portion of the image 114 of the target object.

The display unit may include a hand-held device display, a large-format flat panel displays (e.g. LCD, OLED, etc.), or a head mounted display (e.g. near-eye microdisplay, waveguide relay display, semi-reflective display, virtual retinal display, etc.). In one embodiment, the display unit may be a component of a handheld device, such as a mobile phone, a tablet, a gaming device, and the like. In another embodiment, the display unit may be external to the handheld device and is configured to be communicatively coupled to the handheld device via wired or wireless connection, e.g., a Bluetooth display screen. In an example embodiment, the display unit is a touch screen of a mobile phone.

Figure 3A:
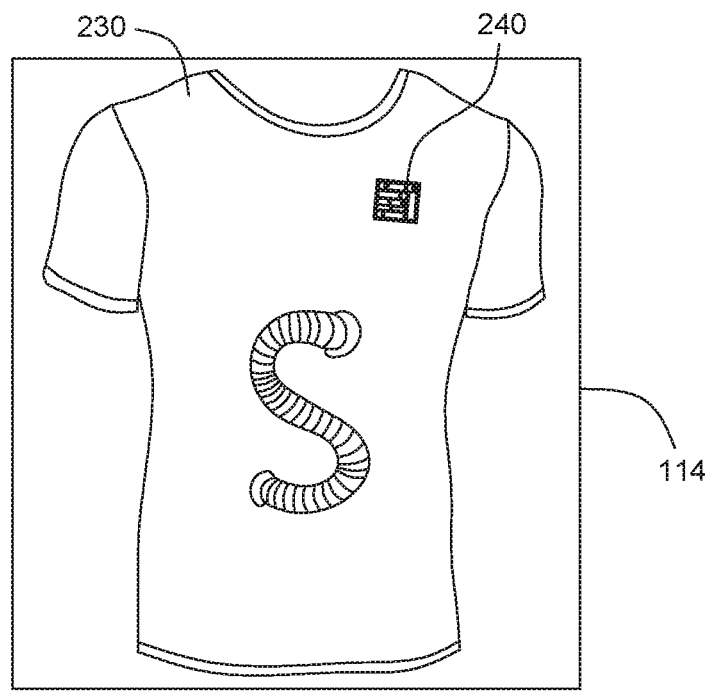
FIG. 3A is a schematic illustration of an example image of the retail item of FIG. 2B, according to some aspects of the present description.
Figure 3B:
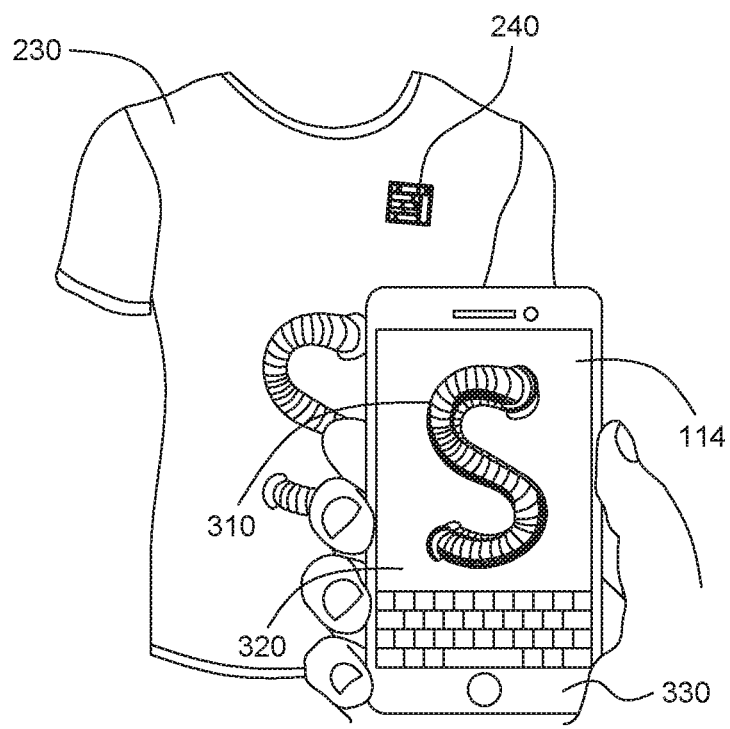
FIG. 3B is a schematic illustration of an example of augmented reality enhanced view of a portion of the image of FIG. 3A, according to some aspects of the present description.

Referring now to FIGS. 3A and 3B, a captured image of a target object and an augmented reality enhanced view of the target object in accordance with an embodiment of the present description are presented. In the example embodiment shown in FIGS. 3A and 3B, a retail item, e.g., a garment, as shown in FIG. 2A, is used for illustration purposes. FIG. 3A shows the image 114 of the garment 230 including a marker 240. The image 114 may be captured at a retail location (e.g., a store, a mall, e-commerce site), at a user's location, or at any other location where a retail item is present actually or virtually.

FIG. 3B shows the augmented reality enhanced view of a portion of the image 114 on which the rendered virtual object 310 is superimposed. In the example embodiment shown in FIG. 3B, the rendered virtual object 310 partially occludes one or more features in the image 114. In another embodiment, the rendered virtual object 310 may complete occlude the features of the image 310. Further, in the embodiment illustrated in FIG. 3B, the rendered virtual object 310 is depicted as a 3D image. However, the rendered virtual object may also include a video, a two-dimensional (2D) animation, or a three-dimensional (3D) animation.

Figure 3C:
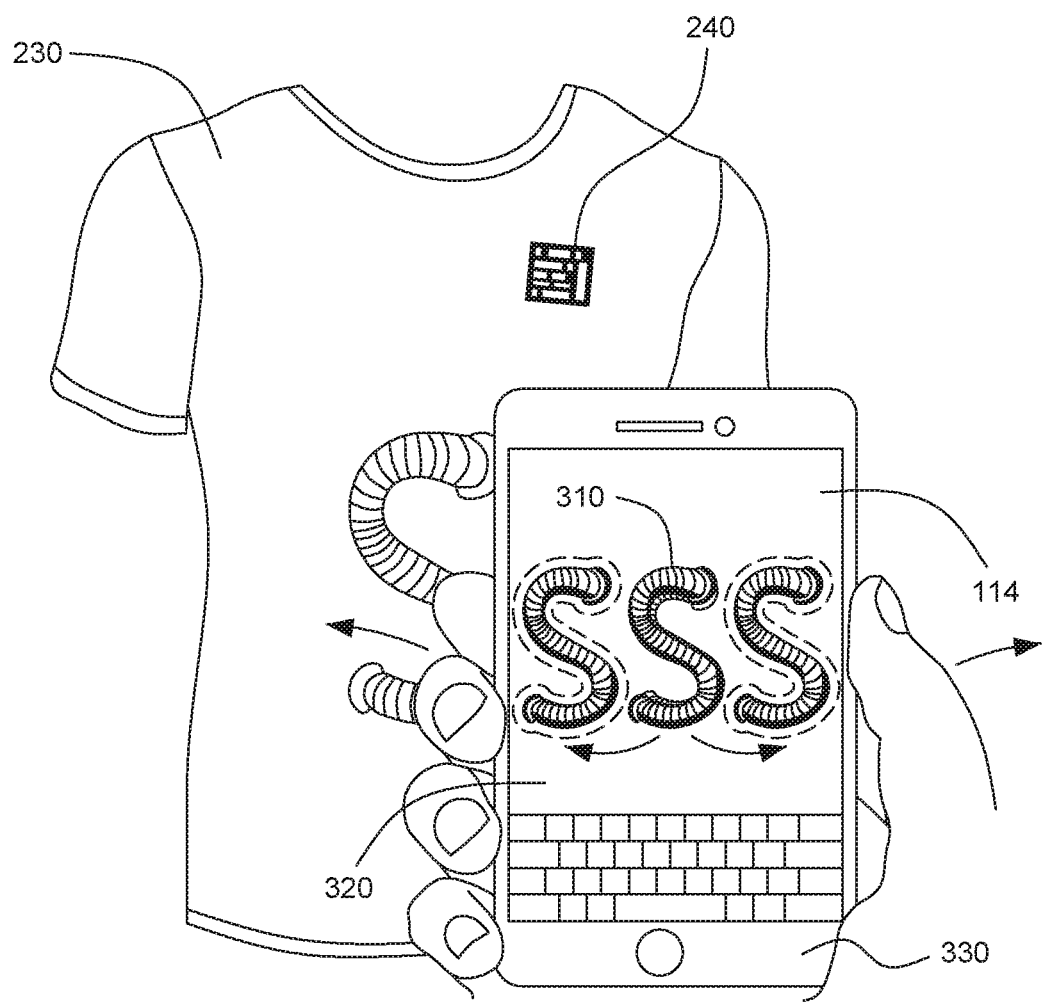
FIG. 3C is a schematic illustration of jitter experienced for augmented reality enhanced view of a portion of the image of FIG. 3A.
Figure 3D:
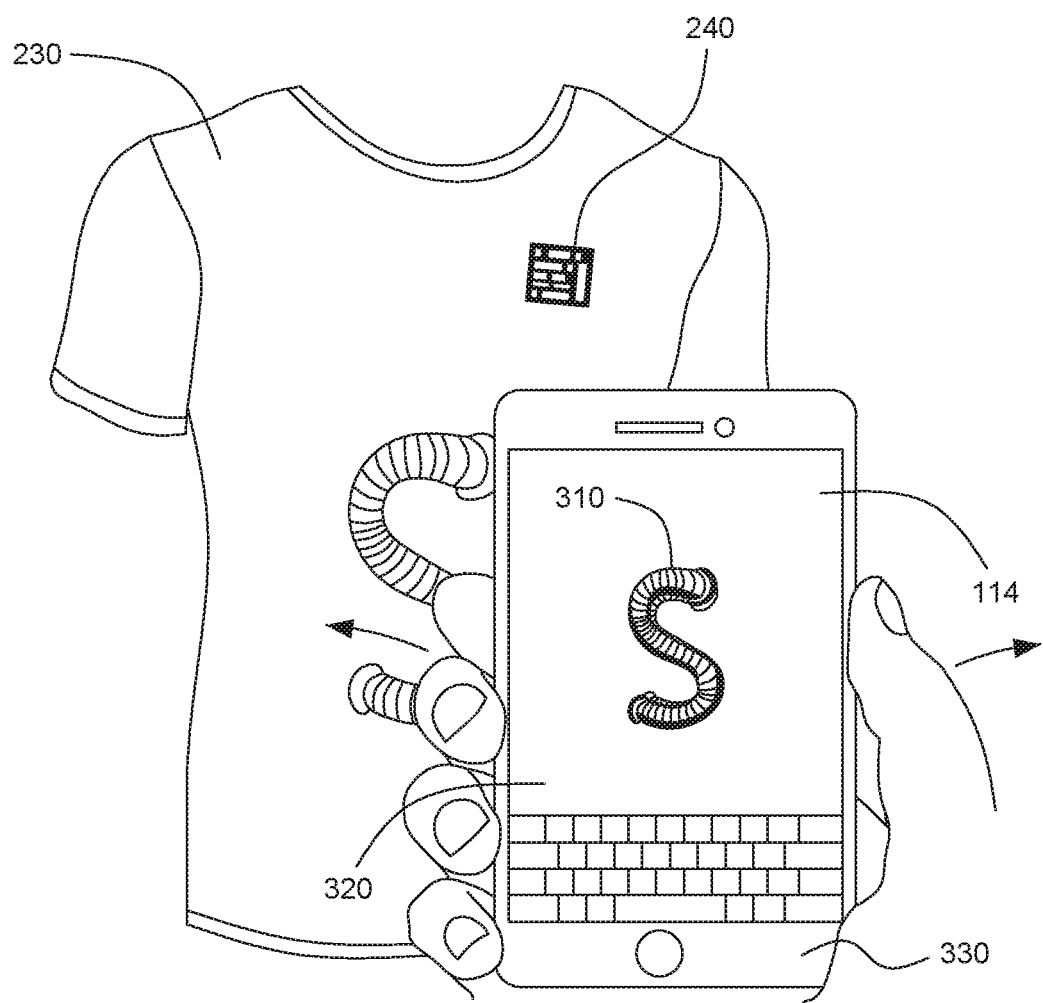
FIG. 3D is a schematic illustration of an example of augmented reality enhanced view of a portion of the image of FIG. 3A without the jitter, according to some aspects of the present description.

The virtual object 310 is rendered on a display screen 320 of a hand-held device 330 (e.g., a mobile phone), as shown in FIGS. 3B-3D. In the embodiment illustrated in FIG. 3C, the real-time position of the marker 240, captured as an image by a camera of the hand-held device may change at least in part, to movements of the camera or movements of the garment itself. For example, the detected marker position may change because of the movements in the user's hands holding the hand-held device 330 (as shown in FIG. 3C). Similarly, in instances when the garment is held or worn by another person, body movements of the person may result in variations in the marker's position. In such instances, rendering of the virtual object 310 based on the originally detected marker location may result in jitter or a noisy experience to the user (as shown by the movement of the rendered object 310 in FIG. 3C). Embodiments of the present description provide for the rendering of the virtual object 310 by substantially reducing or eliminating any jitter that may be experienced by the user holding the hand-held device 330. This is illustrated in FIG. 3D, where in spite of the movement of the user's hands minimal or no jitter is experienced for the rendered object 310.

According to one embodiment, the image 114 received by image receiver 102 may be a sequence of images (e.g., a video feed) on which the virtual object 122 is rendered. The sequences of images are also referred to in the art as "frames." In an example embodiment, the virtual object may be rendered at 60 frames per second (60 fps). In such instances, application of the real-time spatial attributes of the marker ($TSR_{mr}$) to render the virtual object 122 in every frame (i.e., 60 times a second) may substantially increase the jitter. The jitter experienced in such instances may be also compensated using the system 100 of the present description.

Referring again to FIG. 1, according to one embodiment, the image receiver 102 is further configured to receive a sequence of images 114 of the target object in particular time duration. The marker identifier 106 is further configured to identify the real-time spatial attributes 116 of the marker for each image in the received sequence of images 114. The marker adjustment module 108 is further configured to apply the correcting algorithm to the one or more real-time spatial attributes 116 of the marker for each image in the sequence of images. Thereby, determining the one or more adjusted spatial attributes 118 of the marker for each image in the sequence of images. The renderer 112 is further configured to render the virtual object 122 on the display unit, based on the one or more adjusted spatial attributes 118 of the marker for each image in the sequence of images. Thus, in such embodiments, the correcting algorithm is employed to the real-time spatial attributes 116 of the marker for each frame. The virtual object 122 is rendered frame by frame based on the adjusted spatial attributes 118 of the marker for each frame, thereby substantially reducing or eliminating jitter.

In some such embodiments, there might be instances when the real-time time spatial attributes 116 of the marker are not identifiable from an image in the sequence of images 114. For example, the imaging device or marker identifier 106 may not be able to detect the marker and the marker may disappear for a moment. In such instances, the renderer 112 may be further configured to render the virtual object on the display unit, based on the one or more adjusted spatial attributes 118 of the marker from a previous image in the sequence of images 114. For example, in such instances, the correcting algorithm may use the previously calculated adjusted spatial coordinates 118 of the marker and continue to apply it for a required time period. Thus, minimizing flickering of the rendered virtual object 122 on the display unit, and enhancing user experience.

According to one embodiment, the system 100 may be an augmented reality application ("app") executable on a computing device. The computing device may be a suitable handheld device such as a mobile phone, a tablet, or a gaming device. In an example embodiment, the system 110 is an augmented reality application associated with an e-commerce application configured to be installed on a hand-held device such as a mobile phone or a tablet.

Figure 4:
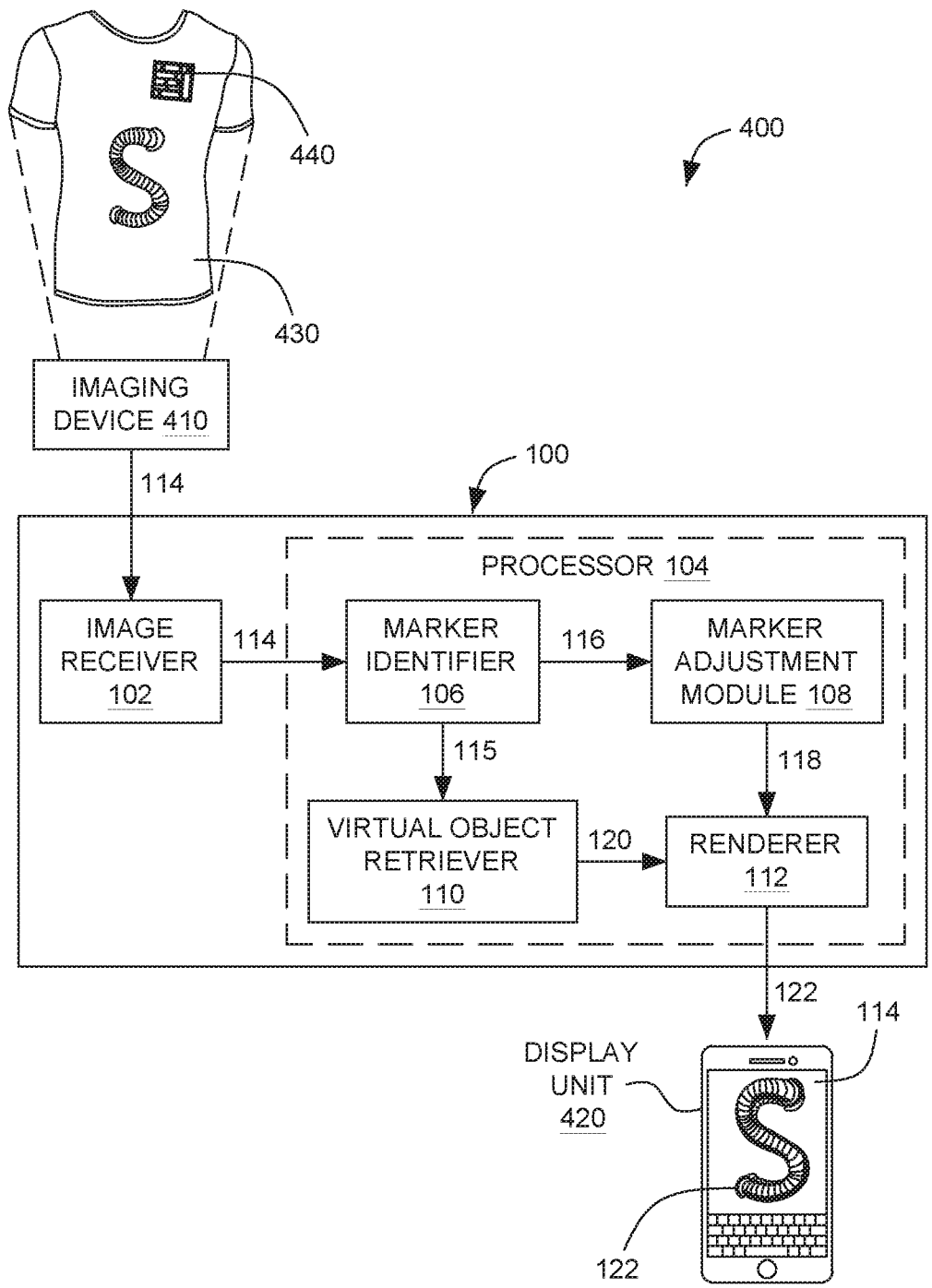
FIG. 4 is a block diagram illustrating a hand-held system for enhancing user experience by using augmented reality in a retail environment, according to some aspects of the present description.

In one aspect, a hand-held system for enhancing user experience by using augmented reality in a retail environment is presented. FIG. 4 is a block diagram of a hand-held system 400 for enhancing user experience using the augmented reality application 100, described earlier with reference to FIG. 1. The hand-held system 400 includes an imaging device 410, a display unit 420, and the augmented reality application 100 communicatively coupled to the imaging device 410 and the display unit 420.

In one embodiment, the hand-held system 400 is as a mobile phone, a tablet, or a gaming device. The imaging device 410 may include a camera configured to capture visible, infrared, or ultraviolet light. In the embodiment illustrated in FIG. 4, the imaging device 410 is a component of a handheld device, such as a camera integrated with a mobile phone, a tablet, or a gaming device. Further, the display unit 420 is integrated with the handheld device, such as a mobile phone display, a tablet display, or a gaming device display. In an example embodiment, the hand-held system 400 is a mobile phone, the imaging device 410 is a mobile phone camera, and the display unit 420 is a touch screen of the mobile phone.

The augmented reality application 100 includes an image receiver 102 and a processor 104 operatively coupled to the image receiver 102. The processor 104 further includes a marker identifier 106, a marker adjustment module 108, a virtual object retriever 110, and a renderer 112.

As shown in FIG. 4, the image receiver 102 is configured to receive an image 114, from the imaging device 410, of a retail item 430 including a marker 440. Non-limited examples of retail items include garments, shoes, bags, consumer electronics, toys, games, or vehicles. In an example embodiment, the retail item 430 is a garment, such as a t-shirt. The image of the retail item 430 may be captured at a retail location (e.g., a store, a mall, e-commerce site), at a user's home, or at any other location where a retail item is shown virtually (e.g., at a bus stop where a billboard is present). In another embodiment, the image of the retail item may be captured after the retail item is purchased, and thus may be independent of the original retail location.

The marker identifier 106 is communicatively coupled to the image receiver 102, and is configured to receive the image 114 of the retail item 430. The image 114 further includes an image of the marker. The marker identifier 106 is configured to identify a unique marker ID 115 and real-time spatial attributes 116 of the marker 440 from the received image 114. The marker identifier 106 is further configured to identify real-time spatial attributes 116 of the marker from the received image 114.

The marker adjustment module 108 is configured to apply a correcting algorithm to one or more real-time spatial attributes 116 of the marker 440 to determine one or more adjusted spatial attributes 118 of the marker 440. The marker adjustment module 108 is communicatively coupled to the marker identifier 106 and configured to receive the one or more real-time spatial attributes 116 of the marker 440 from the marker identifier 106. The marker adjustment module 108 is also communicatively coupled to the renderer 112 and configured to transmit the one or more adjusted spatial attributes 118 of the marker 440 to the renderer 112.

The virtual object retriever 110 is communicatively coupled to the marker identifier 106 and configured to receive the unique marker ID 115 from the marker identifier 106. The virtual object retriever 110 is further configured to retrieve a virtual object 120 associated with the retail item 430, based on the unique marker ID 115. The virtual object retriever 110 is also communicatively coupled to the renderer 112 and configured to transmit the retrieved virtual object to the renderer 112. Non-limiting examples of the virtual object 120 include a video, a two-dimensional (2D) animation, a three-dimensional (3D) animation, a 3D image, or combinations thereof.

The renderer 112 is communicatively coupled to the marker adjustment module 108 and the virtual object retriever 110. The renderer is configured to receive the one or more adjusted spatial attributes 118 of the marker 440 from the marker adjustment module 108 and to receive the retrieved virtual object 120 from the virtual object retriever 110. The renderer is further configured to render the virtual object 122 on the display unit 420, based on the one or more adjusted spatial attributes 118 of the marker 440, wherein the one or more adjusted spatial attributes of the marker 440 compensate for any jitter during the rendering of the virtual object 122.

Additional structural features and the manner of operation of the image receiver 102 and the components of the processor 104 have been described in detail earlier with reference to FIG. 1. The manner of implementation of the system (e.g., an augmented reality application) 100 is described below in FIGS. 5-7.

Figure 5:
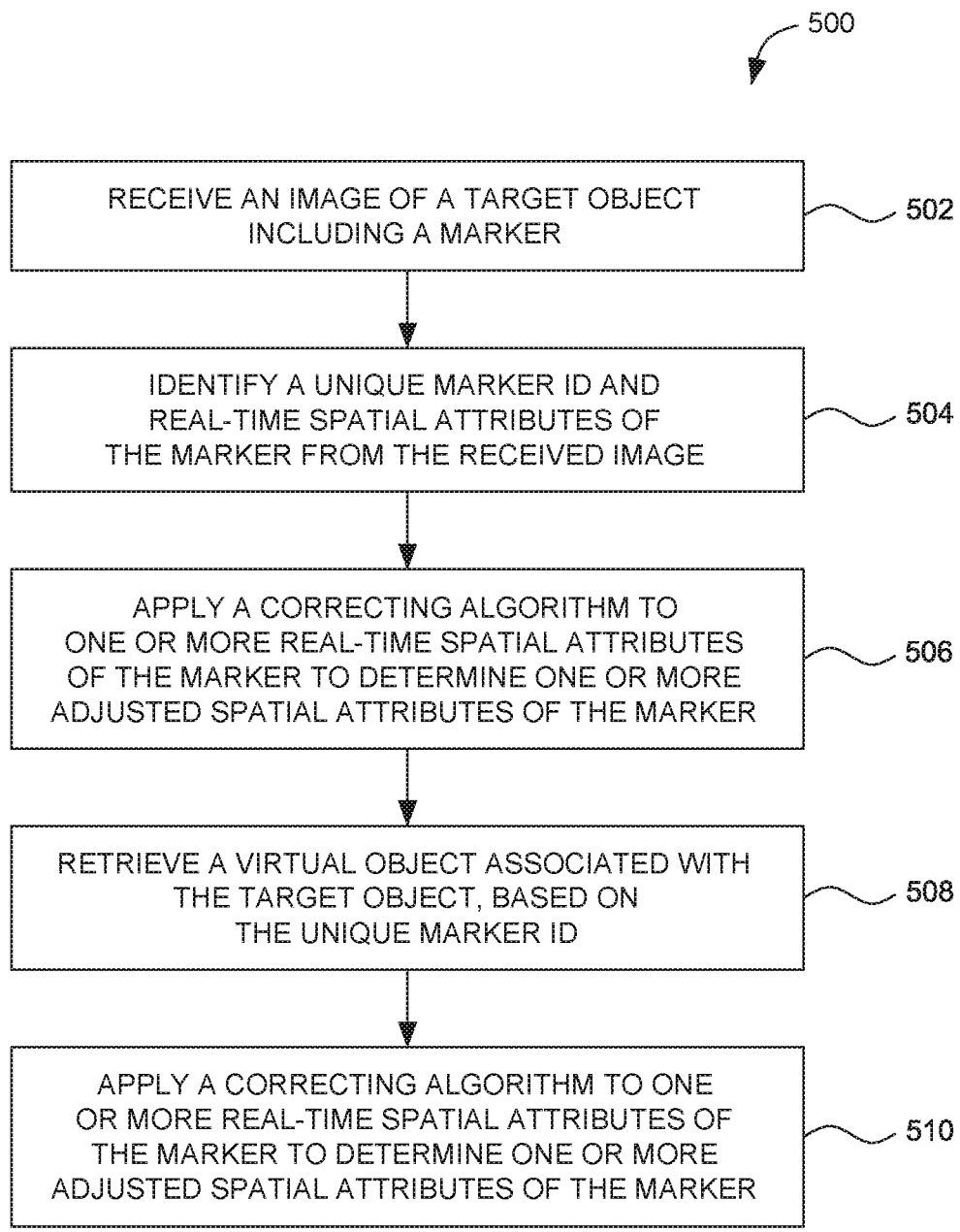
FIG. 5 is a flow chart illustrating a method for enhancing user experience by using augmented reality, according to some aspects of the present description.

FIG. 5 is a flowchart illustrating a method 500 for enhancing user experience by using augmented reality. The method 500 may be implemented using the system of FIG. 1, or the augmented reality application 100 of FIG. 4, according to some aspects of the present description. Each step of the method 500 is described in detail below.

The method 500 includes, at step 502, receiving an image 114 of a target object including a marker, from an imaging device. In an example embodiment, the target object may be a retail item, for example, a garment 230 as shown in FIG. 2B. The target object 230 further includes a marker 240. The image 114 received, at step 502, may be a still image or part of a sequence of images, such as a sequence in a video stream.

The method 500 further includes, at step 504, identifying a unique marker ID 115 and real-time spatial attributes 116 of the marker from the received image 114. In one embodiment, step 504 includes executing an image recognition algorithm to detect a unique marker pattern based on one or more features in the image 114.

In one embodiment, step 504 includes executing an image recognition algorithm to detect a unique marker pattern (e.g., a finder pattern in a 2D bar code) to detect the marker in the received image 114. In such embodiments, step 504 further includes executing a decoding algorithm to determine a binary number associated with the marker. The binary number corresponds to the marker identification, i.e., the unique marker ID 115. In one example embodiment, step 504 includes executing a decoding algorithm to detect a data matrix marker, and identifying a unique marker ID 115 from the data matrix marker.

Step 504 further includes identifying one or more real-time spatial attributes 116 of the marker ($TSR_{mr}$) from the received image 114. In one embodiment, the one or more real-time spatial attributes 116 of the marker include at least one of real-time translational coordinates ($X_{mr}$, $Y_{mr}$, $Z_{mr}$) of the marker or real-time orientation (or rotational) states ($rx_{mr}$, $ry_{mr}$, $rz_{mr}$, $rw_{mr}$) of the marker. The terms "real-time spatial attributes", "real-time translational coordinates", and "real-time orientation states" have been defined earlier.

The method 500 further includes, at step 506, applying a correcting algorithm to one or more real-time spatial attributes 116 of the marker to determine one or more adjusted spatial attributes 118 of the marker. In one embodiment, the correcting algorithm is a filtering algorithm, such as an exponential smoothing algorithm, a low-pass filter algorithm, or a moving average algorithm. In one example embodiment, the correcting algorithm is a low-pass filter algorithm.

In one example embodiment, step 506 may include applying the correcting algorithm to both the real-time translation coordinates ($X_{mr}$, $Y_{mr}$, $Z_{mr}$), of the marker and the real-time orientation states ($rx_{mr}$, $ry_{mr}$, $rz_{mr}$, $rw_{mr}$) of the marker to determine adjusted translation coordinates ($X_{ma}$, $Y_{ma}$, $Z_{ma}$) of the marker and adjusted orientation states ($rx_{ma}$, $ry_{ma}$, $rz_{ma}$, $rw_{ma}$) of the marker. In such instances, a learning parameter (alpha, $\alpha$) of the correcting algorithm applied to the real-time translation coordinates of the marker may be different from a learning parameter (alpha, $\alpha$) of the correcting algorithm applied to the real-time orientation states of the marker.

In an example embodiment, the following equation may be used for calculating the adjusted spatial attributes 118 of the marker:

$$TSR_{ma} = ((1-\alpha) \times TSR_{old}) + (\alpha \times TSR_{mr})$$

where $TSR_{ma}$ is the adjusted TSR value, $TSR_{old}$ is the adjusted TSR value till the last frame, $TSR_{mr}$ is the current frame TSR, and $\alpha$ is the learning parameter. $TSR_{ma}$ will become the value of $TSR_{old}$ for the next frame. As mentioned earlier, TSR has three components (translation, scale, and rotational). According to embodiments of the present description, the correcting algorithm may be applied to the translation and rotational components of the TSR. For example, for X-coordinate, the following equation may be used to calculate the adjusted value:

$$X_{ma} = ((1-\alpha) \times X_{old}) + (\alpha \times X_{mr})$$

where $X_{ma}$ is the adjusted X-coordinate value, $X_{old}$ is the adjusted X-coordinate value till the last frame, $X_{mr}$ is the current frame X-coordinate, and a is the learning parameter. $X_{ma}$ will become the value of $X_{old}$ for the next frame. Similarly, adjusted values for the other translational coordinates and orientation states may be calculated. The manner of choosing the appropriate learning parameter ($\alpha$) for translation and rotational correction is described below with reference to FIG. 6.

Figure 6:
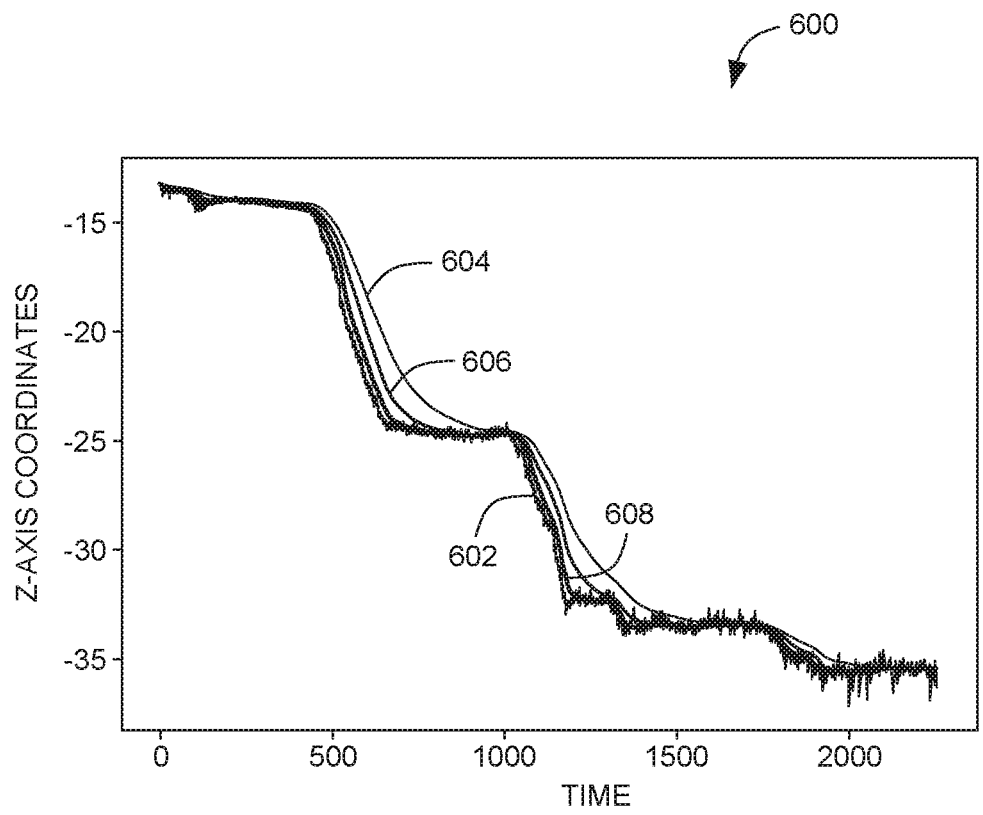
FIG. 6 is an example of an application of the low pass filter algorithm to real-time coordinates of the marker in the Z-direction, according to some aspects of the present description.

An example of an application of the low pass filter algorithm to real-time coordinates of the marker in the Z-direction ($Z_{mr}$) is shown in FIG. 6. In the example shown in FIG. 6, the low pass filter algorithm was applied to about 2500 data points. FIG. 6 is a graph 600 of the real-time ("602") and adjusted values ("604", "606" and "608") of $Z_{mr}$, using different alpha values (0.01, 0.02 and 0.05). As shown in FIG. 6, the real-time value (602) of $Z_{mr}$ show substantial jitter. It was observed that the problem of jitter occurs if higher alpha values (0.05, shown as "608") are chosen, while for low alpha value (0.01, shown as "604") selection, the virtual object didn't move much along with the marker. Application of low pass filter algorithm with an alpha value of 0.02 (shown as "606") provided the desired jitter reduction along with the best tracking of the marker, Application of low pass filter algorithm with an alpha value of 0.02 to the $X_{mr}$ and $Y_{mr}$-axis coordinates showed reduced jitter as well. However, for the rotational states $rz_{mr}$ and $rx_{mr}$, an alpha value of 0.01 showed better jitter reduction. Therefore, in the example embodiment, an alpha value of 0.02 was chosen for translation correction and 0.01 was chosen for rotational correction.

Referring again to FIG. 5, step 508 includes retrieving a virtual object 120 associated with the target object, based on the unique marker ID 115. In one embodiment, step 508 may include querying a virtual object database that stores virtual objects. Step 508 may further include executing a matching algorithm that matches the unique marker ID 115 received from the marker identifier 106 with the marker IDs of the stored virtual objects. Once a match is made, step 508 includes retrieving the virtual object 120 corresponding to unique marker ID 115. Non-limiting examples of the virtual object 120 include a video, a two-dimensional (2D) animation, a three-dimensional (3D) animation, a 3D image, or combinations thereof.

Step 510 includes rendering the virtual object 122 on a display unit, based on the one or more adjusted spatial attributes 118 of the marker. The adjusted spatial attributes of the marker compensate for any jitter during the rendering of the virtual object.

By using the one or more adjusted spatial coordinates of the marker ($TSR_{ma}$), any jitter experienced during rendering of the virtual object may be compensated. This is in contrast to augmented reality applications that use the real-time spatial attributes of the marker ($TSR_{mr}$) to render the virtual object. In one embodiment, the jitter may be substantially reduced. In another embodiment, the jitter may be eliminated, thereby enhancing user experience.

The rendered virtual object 122 may be overlaid completely or partially on the image 114 captured using the imaging device. Thus, the rendered virtual object 122 may be overlaid on a background including the captured image 114. Furthermore, the rendered virtual 122 may be overlaid on the complete image 114 of the target object or a portion of the image 114 of the target object.

According to one embodiment, the image 114 received at step 502 may be a sequence of images on which the virtual object 122 is rendered. The sequences of images are also referred to in the art as "frames." In an example embodiment, the virtual object may be rendered at 60 frames per second (60 fps). In such instances, application of the real-time spatial attributes of the marker ($TSR_{mr}$) to render the virtual object 122 in every frame (i.e., 60 times a second) may substantially increase the jitter. The jitter experienced in such instances may be compensated using the method of the present description.

Figure 7:
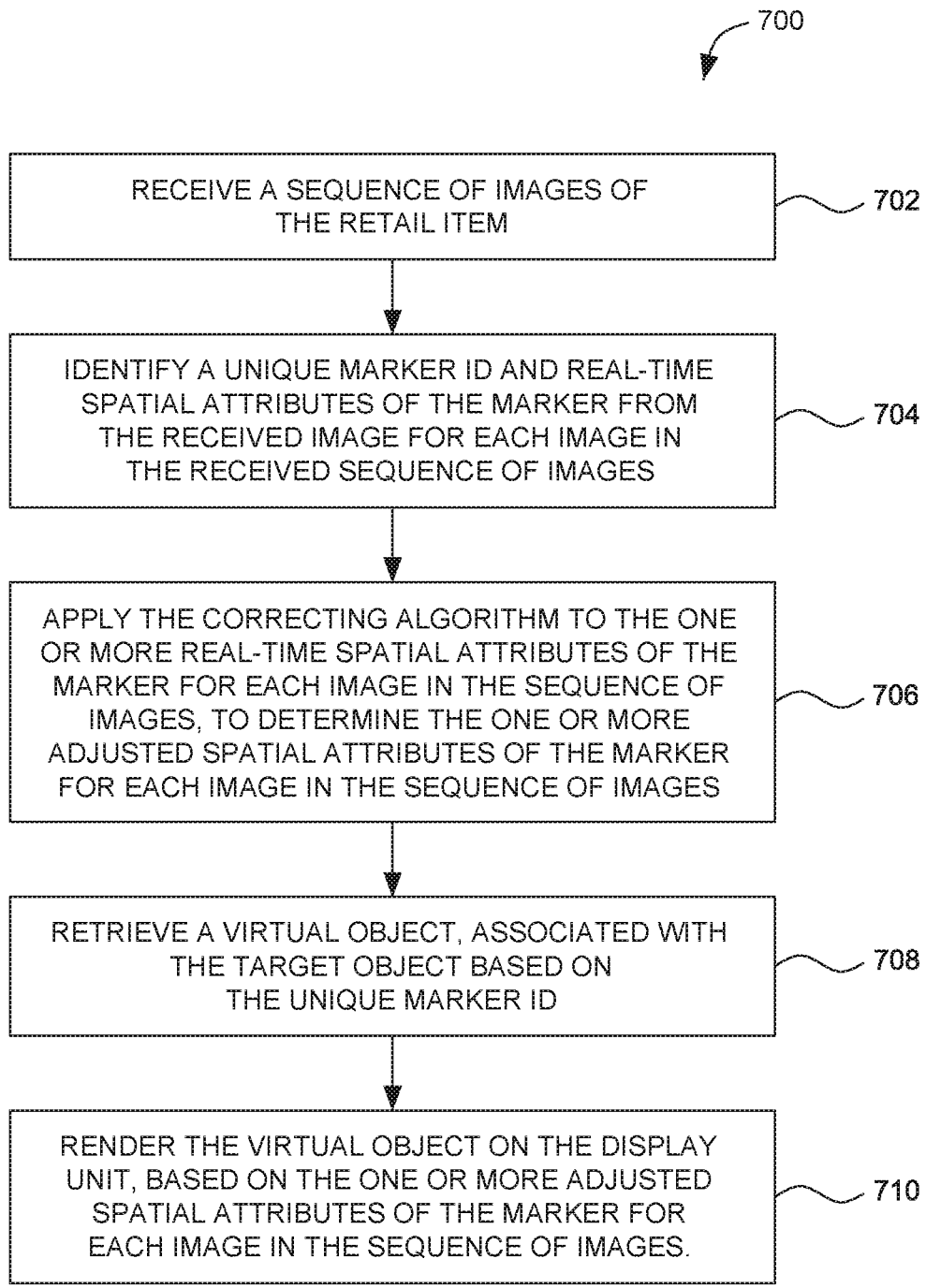
FIG. 7 is a flow chart illustrating a method for enhancing user experience by using augmented reality in a sequence of images, according to some aspects of the present description.

FIG. 7 illustrates a flow chart of a method 700 for enhancing user experience by using augmented reality in a sequence of images 114. Step 702 includes receiving a sequence of images of the target object in a particular time duration. Step 704 includes identifying a unique marker ID 115 from the received sequence of image 114. Step 704 further includes identifying one or more real-time spatial attributes 116 of the marker for each image in the sequence of images 114. Step 706 includes applying the correcting algorithm to the one or more real-time spatial attributes 116 of the marker for each image in the sequence of images 116, to determine the one or more adjusted spatial attributes 118 of the marker for each image in the sequence of images. Step 708 includes retrieving a virtual object, associated with the target object based on the unique marker ID 115. Step 710 includes rendering the virtual object on the display unit, based on the one or more adjusted spatial attributes 118 of the marker for each image in the sequence of images 114.

Thus, in such embodiments, the correcting algorithm is employed to the real-time spatial attributes 116 of the marker for each frame. The virtual object 122 is rendered frame by frame based on the adjusted spatial attributes 118 of the marker for each frame, thereby substantially reducing or eliminating jitter.

In some such embodiments, there might be instances when the real-time time spatial attributes 116 of the marker are not identifiable from an image in the sequence of images 114. For example, the imaging device or marker identifier 106 may not be able to detect the marker and the marker may disappear for a moment. In such instances, the correcting algorithm may use the previously calculated adjusted spatial coordinates 118 of the marker and continue to apply it for a required time period. Step 710 may include rendering the virtual object on the display unit, based on the one or more adjusted spatial attributes of the marker from a previous image in the sequence of images. Thus, minimizing flickering of the rendered virtual object 122 on the display unit.

The system(s), described herein, may be realized by hardware elements, software elements and/or combinations thereof. For example, the modules and components illustrated in the example embodiments may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or more software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

Embodiments of the present description provide for systems and methods for enhanced augmented reality experience by substantially reducing or eliminating any jitter that may be experienced by the user. In example embodiments, wherein the augmented reality experience is rendered on a hand-held device such as a mobile phone, Embodiments of the present description provide for systems and methods for augmented reality applications that may be implemented on mobile phones independent of the operating systems and/or the architecture of the mobile phone.

While only certain features of several embodiments have been illustrated, and described herein, many modifications and changes will occur to those skilled in the art. It is, therefore, to be understood that the appended claims are intended to cover all such modifications and changes as fall within the scope of the invention and the appended claims.

The invention claimed is:

1. A system for enhancing augmented reality user experience, the system comprising:
an image receiver configured to receive an image, from an imaging device, of a target object comprising a marker; and
a processor operatively coupled to the image receiver, the processor comprising:

a marker identifier configured to identify, based on the received image, a unique marker ID, and real-time translation coordinates and real-time orientation states of the marker;

a marker adjustment module configured to apply a correcting algorithm with a first learning parameter and a second learning parameter to the real-time translation coordinates and the real-time orientation states of the marker to determine adjusted real-time translation coordinates and adjusted real-time orientation states of the marker;

a virtual object retriever configured to retrieve, based on the unique marker ID, a virtual object; and a renderer configured to render the virtual object on a display unit, based on the adjusted real-time translation coordinates and the adjusted real-time orientation states of the marker, wherein the adjusted real-time translation coordinates and the adjusted real-time orientation states of the marker compensate for jitter during the rendering of the virtual object.

2. The system of claim 1, wherein:

the image receiver is further configured to receive a sequence of images of the target object;

the marker identifier is further configured to identify real-time translation coordinates and real-time orientation states of the marker for each image in the received sequence of images;

the marker adjustment module is further configured to apply the correcting algorithm with the first learning parameter and the second learning parameter to the real-time translation coordinates and the real-time orientation states of the marker for each image in the sequence of images to determine adjusted real-time translation coordinates and adjusted real-time orientation states of the marker for each image in the sequence of images; and the renderer is further configured to render the virtual object on the display unit, based on the adjusted real-time translation coordinates and the adjusted real-time orientation states of the marker for each image in the sequence of images.

3. The system of claim 2, wherein, when real-time translation coordinates and real-time orientation states of the marker for an image in the sequence of images are not identifiable, the renderer is further configured to render the virtual object on the display unit, based on adjusted translation coordinates and adjusted real-time orientation states of the marker from a previous image in the sequence of images.

4. The system of claim 1, wherein the correcting algorithm is an exponential smoothing algorithm, a low pass filter algorithm, or moving average algorithm.

5. The system of claim 1, wherein the virtual object comprises a video, a two-dimensional (2D) animation, a three-dimensional (3D) animation, a 3D image, or combinations thereof.

6. The system of claim 1, wherein the first learning parameter has a different value than the second learning parameter.

7. A hand-held system for enhancing augmented reality user experience, the hand-held system comprising:

an imaging device configured to receive an image of a retail item comprising a marker;

a display unit; and a processor operatively coupled to the imaging device and the display unit, the processor being configured to execute an augmented reality application, the augmented reality application comprising:

a marker identifier configured to identify, based on the received image, a unique marker ID, and real-time translation coordinates and real-time orientation states of the marker;

a marker adjustment module configured to apply a correcting algorithm with a first learning parameter and a second learning parameter to the real-time translation coordinates and the real-time orientation states of the marker to determine adjusted real-time translation coordinates and adjusted real-time orientation states of the marker;

a virtual object retriever configured to retrieve, based on the unique marker ID, a virtual object; and a renderer configured to render the virtual object on the display unit, based on the adjusted real-time translation coordinates and the adjusted real-time orientation states of the marker, wherein the adjusted real-time translation coordinates and the adjusted real-time orientation states of the marker compensate for jitter during the rendering of the virtual object.

8. The hand-held system of claim 7, wherein:

the image device is further configured to receive a sequence of images of the retail item;

the marker identifier is further configured to identify real-time translation coordinates and real-time orientation states of the marker for each image in the received sequence of images;

the marker adjustment module is further configured to apply the correcting algorithm with the first learning parameter and the second learning parameter to the real-time translation coordinates and the real-time orientation states of the marker for each image in the sequence of images to determine adjusted real-time translation coordinates and adjusted real-time orientation states of the marker for each image in the sequence of images; and the renderer is further configured to render the virtual object on the display unit, based on the adjusted real-time translation coordinates and the adjusted real-time orientation states of the marker for each image in the sequence of images.

9. The hand-held system of claim 8, wherein when real-time translation coordinates and real-time orientation states of the marker for an image in the sequence of images are not identifiable, the renderer is further configured to render the virtual object on the display unit, based on adjusted real-time translation coordinates and adjusted real-time orientation states of the marker from a previous image in the sequence of images.

10. The hand-held system of claim 7, wherein the hand-held system is a mobile phone, a tablet, an eyewear, or a head-mounted device.

11. The hand-held system of claim 7, wherein the first learning parameter has a different value than the second learning parameter.

12. The hand-held system of claim 7, wherein the virtual object comprises a video, a two-dimensional (2D) animation, a three-dimensional (3D) animation, a 3D image, or combinations thereof.

13. The hand-held system of claim 7, wherein the correcting algorithm is an exponential smoothing algorithm, a low pass filter algorithm, or moving average algorithm.

14. A method for enhancing augmented reality user experience, the method comprising:

receiving, from an imaging device, an image of a target object comprising a marker;

identifying, based on the received image, a unique marker ID, and real-time translation coordinates and real-time orientation states of the marker;

applying a correcting algorithm with a first learning parameter and a second learning parameter to the real-time translation coordinates and the real-time orientation states of the marker to determine adjusted real-time translation coordinates and adjusted real-time orientation states of the marker;

retrieving, based on the unique marker ID, a virtual object; and rendering the virtual object on a display unit, based on the adjusted real-time translation coordinates and the adjusted real-time orientation states of the marker, wherein the adjusted real-time translation coordinates and the adjusted real-time orientation states of the marker compensate for jitter during rendering of the virtual object.

15. The method of claim 14, further comprising:

receiving a sequence of images of the target object;

identifying real-time translation coordinates and real-time orientation states of the marker for each image in the received sequence of images;

applying the correcting algorithm with the first learning parameter and the second learning parameter to the real-time translation coordinates and the real-time orientation states of the marker for each image in the sequence of images to determine adjusted real-time translation coordinates and adjusted real-time orientation states of the marker for each image in the sequence of images; and rendering the virtual object on the display unit, based on the adjusted real-time translation coordinates and the adjusted real-time orientation states of the marker for each image in the sequence of images.

16. The method of claim 15, wherein, when real-time translation coordinates and real-time orientation states of the marker for an image in the sequence of images are not identifiable, the method comprises rendering the virtual object on the display unit, based on adjusted translation coordinates and adjusted real-time orientation states of the marker from a previous image in the sequence of images.

17. The method of claim 14, wherein the first learning parameter has a different value than the second learning parameter.

18. The method of claim 14, wherein the virtual object comprises a video, a two-dimensional (2D) animation, a three-dimensional (3D) animation, a 3D image, or combinations thereof.

19. The method of claim 14, wherein the correcting algorithm is an exponential smoothing algorithm, a low pass filter algorithm, or moving average algorithm.

* * * * *